US009735878B2

United States Patent
Enoki et al.

(10) Patent No.: US 9,735,878 B2
(45) Date of Patent: Aug. 15, 2017

(54) OPTICAL TRANSMITTER AND CONTROL METHOD OF OPTICAL TRANSMITTER

(71) Applicant: Mitsubishi Electric Corporation, Chiyoda-ku (JP)

(72) Inventors: Kentaro Enoki, Tokyo (JP); Yasuhisa Shimakura, Tokyo (JP); Eiji Yagyu, Tokyo (JP); Hiroaki Shintaku, Tokyo (JP); Shusaku Hayashi, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 29 days.

(21) Appl. No.: 14/558,880

(22) Filed: Dec. 3, 2014

(65) Prior Publication Data

US 2015/0171971 A1   Jun. 18, 2015

(30) Foreign Application Priority Data

Dec. 12, 2013   (JP) ................................. 2013-256685

(51) Int. Cl.
*H04B 10/00*  (2013.01)
*H04B 10/50*  (2013.01)

(52) U.S. Cl.
CPC ... *H04B 10/50575* (2013.01); *H04B 10/5053* (2013.01)

(58) Field of Classification Search
None
See application file for complete search history.

(56) References Cited

U.S. PATENT DOCUMENTS 3,780,296 A * 12/1973 Waksberg ............. G02F 1/0123
                                                                250/201.1
2009/0115544 A1 * 5/2009 Kershteyn ........... H04L 27/2075
                                                                332/103

(Continued)

FOREIGN PATENT DOCUMENTS

JP       2004-531750      10/2004
JP       2004-318052      11/2004

(Continued)

OTHER PUBLICATIONS

Japanese Office Action dated Aug. 9, 2016 in Japanese Patent Application No. 2013-256685 (with English translation), 6 pages.

*Primary Examiner* — Nathan Curs
*Assistant Examiner* — David Lambert
(74) *Attorney, Agent, or Firm* — Oblon, McClelland, Maier & Neustadt, L.L.P.

(57) ABSTRACT

An optical modulation unit included in an optical transmitter includes two optical modulators that modulate each of two light beams based on applied bias voltages and input modulation signals, and an optical phase regulator that is connected to either of the two optical modulators, and regulates a phase of the light beam incident on the optical modulator. In a state where no modulation signal is input to the two optical modulators, while keeping bias voltages to be applied to one optical modulator and the optical phase regulator constant, the controller determines a first initial bias voltage such that an output light beam from the other optical modulator becomes zero. Thereafter, the controller determines a second initial bias voltage such that an output light beam from the one optical modulator becomes zero, while applying the first initial bias voltage to the other optical modulator.

11 Claims, 7 Drawing Sheets

(56) References Cited

U.S. PATENT DOCUMENTS

2012/0155880 A1\* 6/2012 Nishimoto ....... H04B 10/50572
  398/79
2012/0288284 A1\* 11/2012 Yoshida ............. H04B 10/5053
  398/186

FOREIGN PATENT DOCUMENTS

| JP | 2011-69924 | 4/2011 |
| JP | 2011-150052 | 8/2011 |
| JP | 2011-197638 | 10/2011 |
| JP | 2012-217127 | 11/2012 |
| JP | 2012217127 A \* | 11/2012 |

\* cited by examiner

F I G . 1
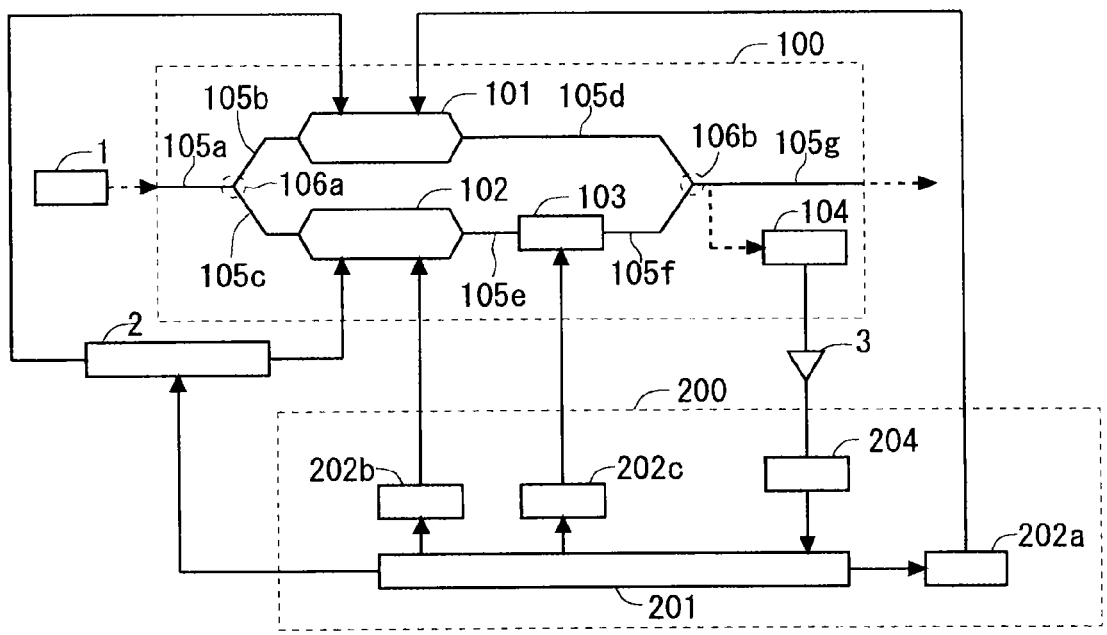
F I G . 2
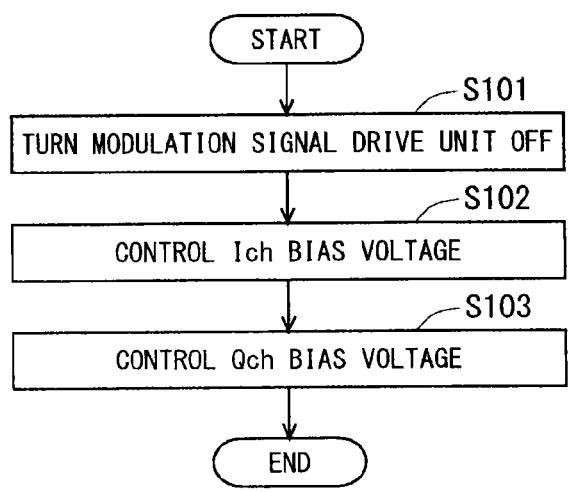

F I G . 3
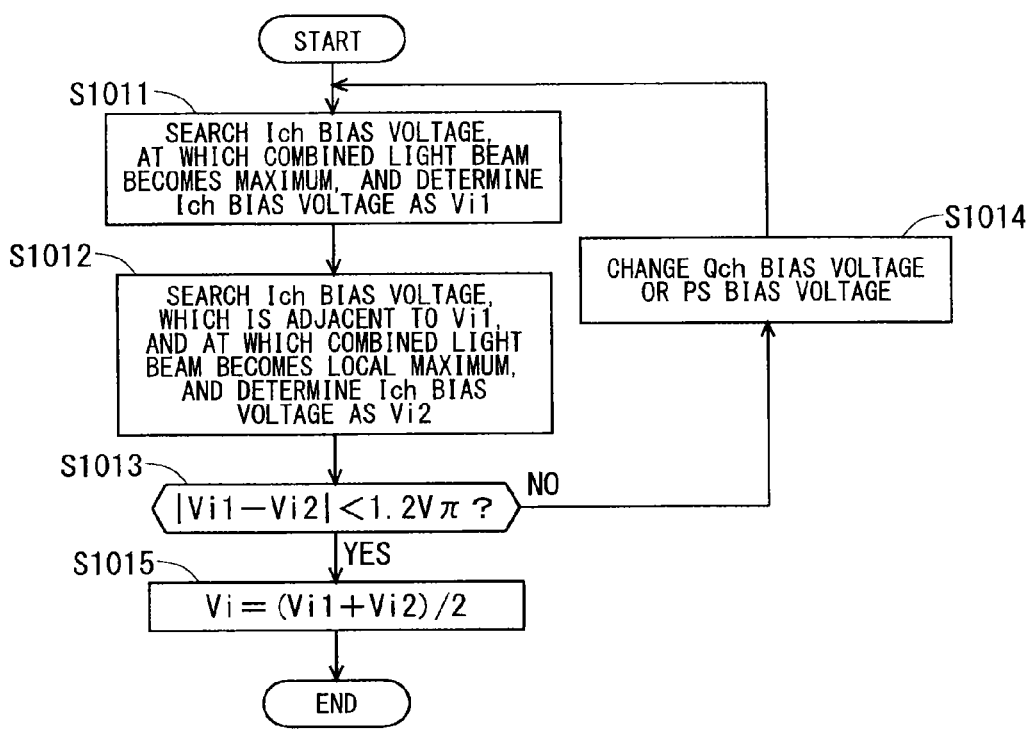

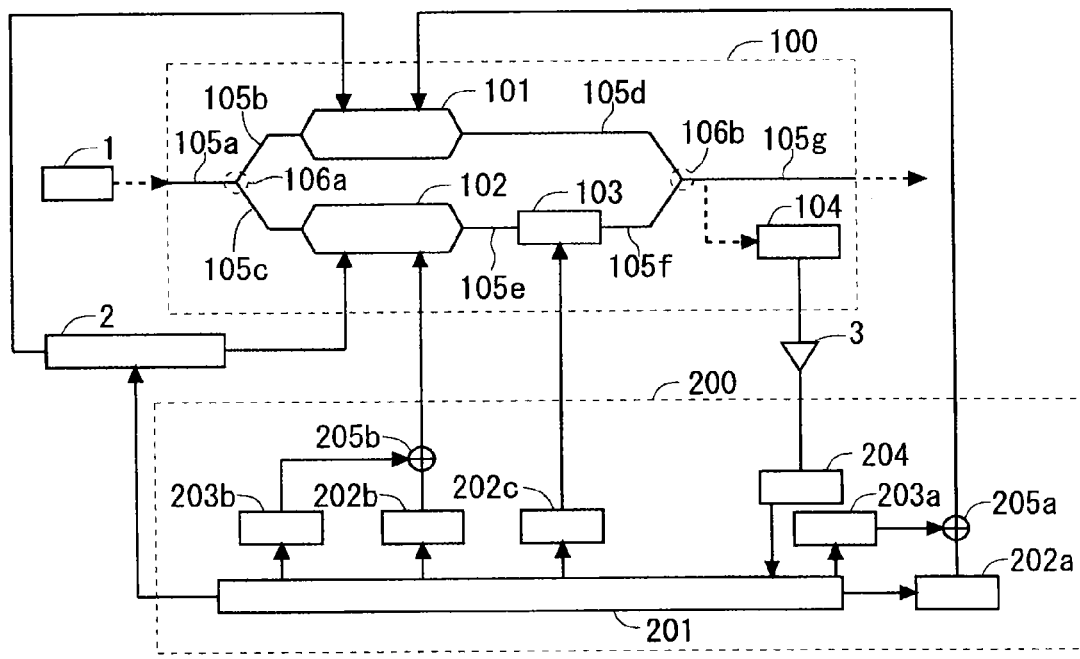
F I G. 6

OPTICAL TRANSMITTER AND CONTROL METHOD OF OPTICAL TRANSMITTER

BACKGROUND OF THE INVENTION

Field of the Invention

The invention relates to an optical transmitter, and a control method of an optical transmitter, and more particularly to an optical transmitter including an optical modulation unit that modulates an incident light beam, a modulation signal drive unit that inputs a modulation signal to the optical modulation unit, a controller that controls the optical modulation unit and the modulation signal drive unit.

Description of the Background Art

It is known that the optimum bias voltage of an MZ (Mach-Zehnder) optical modulator drifts by temperature or aging change. Therefore, in order to keep the quality of a transmission optical signal, control for making a bias voltage to follow an optimum bias value is performed. For example, in an optical transmitter that performs ABC (automatic bias control) of an I/Q modulator, there is known an optical transmitter that controls three bias voltages, I-ch, Q-ch, and Phase in turn in a state where an arbitrary electric waveform is input, superimposes low-frequency signals (Dither) on the bias voltages of I-ch and Q-ch at this time, and performs feedback control to a convergence point where an error signal of Dither detected from a monitor PD (Photo-Diode) current becomes 0.

In an optical transmitter disclosed in Japanese Patent Application Laid-Open No. 2012-217127, as a method of searching initial values of respective bias voltages to be applied to first and second mach-zehnder optical modulators when the CW (Continuous Wave) optical output of an optical modulation unit is the most extinct, each a total of three points of the respective bias voltages of the first and second mach-zehnder optical modulators, and the bias voltage of an optical phase regulator are each changed in a range of $\pm V\pi$, and an optical output level is monitored and determined. Only a combined light beam of the first and second mach-zehnder optical modulators can be monitored, and therefore there is a possibility that even when the combined light beam is in an extinction state, output light beams from the first mach-zehnder optical modulator and the second mach-zehnder optical modulator are mutually opposite in phase. Therefore, it is difficult to determine whether the output light beam from each of the first and second mach-zehnder optical modulators is in the extinction state. Therefore, in a system disclosed in Japanese Patent Application Laid-Open No. 2012-217127, an optimum bias voltage is determined by the combination of the total of the three points of the respective bias voltages of the first and second mach-zehnder optical modulators, and the bias voltage of the optical phase regulator. Accordingly, there is a problem that it takes a long time.

SUMMARY OF THE INVENTION

An object of the present invention is to provide an optical transmitter capable of determining initial values of respective bias voltages to be applied to two modulators in a short time, and a control method of the optical transmitter.

An optical transmitter according to the present invention is an optical transmitter including: an optical modulation unit that modulates an incident light beam; a modulation signal drive unit that inputs a modulation signal to the optical modulation unit; and a controller that controls the optical modulation unit and the modulation signal drive unit.

The optical modulation unit includes: a branch unit that branches a light beam incident from a light source into two light beams; two mach-zehnder optical modulators that modulate the respective two light beams based on applied bias voltages and input modulation signals; an optical phase regulator that is connected to either of the two optical modulators, and regulates a phase of the light beam incident on the optical modulator based on an applied bias voltage; a multiplexer that multiplexes output light beams from the two optical modulators and outputs a multiplexed light beam; and a light intensity detector that detects intensity of the light beam output from the multiplexer. The modulation signal drive unit inputs the modulation signal to each of the two optical modulators. The controller is a controller that searches for bias voltages to be applied to the two optical modulators in an initial state as a state where the modulation signals are not input, and determines the bias voltages. In a state where the modulation signal is not input to each of the two optical modulators, while keeping bias voltages to be applied to one optical modulator of the two optical modulators and the optical phase regulator constant, the controller determines a bias voltage to be applied to the other optical modulator as a first initial bias voltage such that an output light beam from the other optical modulator of the two optical modulators becomes zero, based on the intensity of the light beam detected by the light intensity detector. The controller thereafter determines a bias voltage to be applied to the one optical modulator as a second initial bias voltage such that an output light beam from the one optical modulator becomes zero, based on the intensity of the light beam detected by the light intensity detector, while applying the first initial bias voltage to the other optical modulator, and keeping the bias voltage to be applied to the optical phase regulator constant.

The search is not performed while the bias voltages of the two optical modulators are changed at the same time, but the bias voltage of the other optical modulator is searched in a state where the bias voltage of the one optical modulator is fixed, and therefore the searches for the first and second initial bias voltages can be completed at a higher speed.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram of an optical transmitter according to a first preferred embodiment;

FIG. 2 is a flowchart of a bias control method of the optical transmitter according to the first preferred embodiment;

FIG. 3 is a flowchart of an Ich bias voltage control method of the optical transmitter according to the first preferred embodiment;

FIG. 6 is a block diagram of an optical transmitter according to the second preferred embodiment and the third preferred embodiment;

DESCRIPTION OF THE PREFERRED EMBODIMENTS

First Preferred Embodiment

<Configuration>

Figure 4:
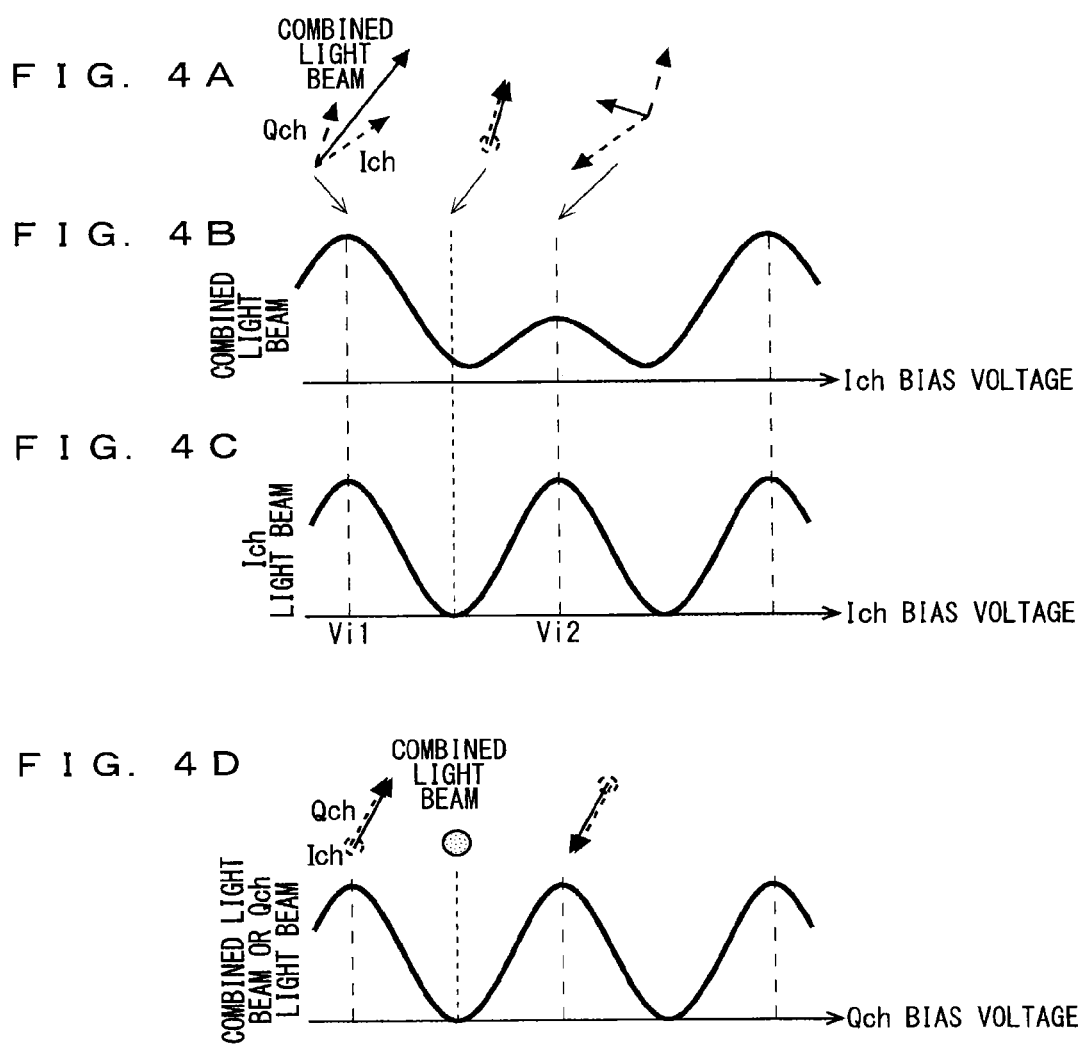
FIGS. 4A to 4D are views each illustrating the Ich bias voltage control method of the optical transmitter according to the first preferred embodiment.

FIG. 1 is a function block diagram of an optical transmitter according to this preferred embodiment. The optical transmitter according to this preferred embodiment includes an optical modulation unit 100 that modulates a beam incident from a light source 1, based on an input modulation signal and an input bias voltage, a modulation signal drive unit 2 that inputs the modulation signal to the optical modulation unit 100, and a controller 200 that controls operation of the optical modulation unit 100 and the modulation signal drive unit 2. The light source 1 and the optical modulation unit 100 are optically connected by, for example, an optical fiber.

The optical modulation unit 100 includes a first optical modulator 101, a second optical modulator 102, and an optical phase regulator 103. The first and second optical modulators 101 and 102, and the optical phase regulator 103 are formed in a substrate containing, for example, lithium niobate. Additionally, on the substrate, optical waveguides 105a to 105g are formed.

As shown in FIG. 1, the optical waveguide 105a, on which a light beam from the light source 1 is incident, is branched into the optical waveguide 105b and the optical waveguide 105c to be connected to the respective input sides of the first and second optical modulators 101 and 102. The output side of the second optical modulator 102 is connected to the optical phase regulator 103 through the optical waveguide 105e. Emission light beams from the first optical modulator 101 and the optical phase regulator 103 are multiplexed in the optical waveguide 105g through the optical waveguides 105d and 105f to be output from the optical modulation unit 100. Additionally, a part of the light beam that passes through the optical waveguide 105g is incident on a light intensity detector 104.

The first and second optical modulators 101 and 102 are mach-zehnder optical modulators. To each of the first and second optical modulators 101 and 102, a modulation signal is input from the modulation signal drive unit 2. Additionally, to the first and second optical modulators 101 and 102 and the optical phase regulator 103, respective bias voltages are input from the controller 200.

A part of a combined light beam drawn to the light intensity detector 104 is converted into a current signal in accordance with light intensity. The current signal is converted into a voltage signal by a current voltage converter 3 to be input to a monitor 204 provided in the controller 200.

In FIG. 1, the controller 200 includes a synchronization detector 201, bias applying units 202a, 202b and 202c, and the monitor 204. The synchronization detector 201 obtains an initial value of a bias voltage to be applied to each of the first and second optical modulators 101 and 102 as an initial value search state, based on the voltage signal input to the monitor 204. The operation of the synchronization detector 201 will be described later.

The bias applying units 202a, 202b and 202c apply bias voltages to the first optical modulator 101, the second optical modulator 102, and the optical phase regulator 103, respectively.

The light source 1 is a semiconductor laser whose constituent material is, for example, InP based compound semiconductor mixed crystal, and emits and outputs laser light as continuous waves having a wavelength band of 1.5 µm. The configuration of the light source 1 is not limited to this. For example, waves having a wavelength band of 1.3 µm, or pulse waves, a solid state laser, or the like may be used. In short, waves or the like that emit a light beams for implementing desired optical communication are applicable as a preferred embodiment of the present invention.

The first and second optical modulators 101 and 102 are formed by, for example, lithium niobate crystals as constituent materials, and mach-zehnder optical modulators utilizing refractive index variation by electric field application, a so-called electro-optical effect. The mach-zehnder optical modulator is configured by connecting two optical waveguides, which form electrodes, in parallel between two Y-branch optical waveguides, as a so-called mach-zehnder interferometer. The mach-zehnder optical modulator gives light intensity variation according to a phase difference between the two optical waveguides due to refractive index variation by modulation signals input to modulating electrodes and bias voltages applied to bias electrodes, to light beams that pass through the mach-zehnder interferometers, and outputs the light beams. The mach-zehnder optical modulator is an optical modulator capable of attaining both high speed and high signal quality called low chirp.

The optical modulation unit 100 is a dual-parallel MZ optical modulator (DP-MZM: dual-parallel Mach-Zehnder modulator) that generates a complex photoelectric field by connecting two mach-zehnder optical modulators serving as the first and second optical modulators 101 and 102 in parallel as a mach-zehnder interferometer, giving a carrier wave phase difference of $\pi/2$, and multiplexing an Ich (In-phase channel) optical signal that is a real part, and a Qch (Quadrature-phase channel) optical signal that is an imaginary part. The dual-parallel MZ optical modulator is also referred to as an I/Q modulator.

In the optical modulation unit 100, the first and second optical modulators 101 and 102 each include a modulating electrode to which a modulation signal is input, and a bias electrode to which a bias voltage is applied. Additionally, a phase control electrode PS (Phase Shift) serving as the optical phase regulator 103 is provided on one of the respective optical waveguides that connect the mach-zehnder optical modulators in parallel.

The configurations of the optical modulation unit 100, the first optical modulator 101, and the second optical modulator 102 are not limited to this. An optical modulator in which an optimum bias voltage drifts by temperature or aging change is applicable as a preferred embodiment of the present invention.

<Operation>

The controller 200 provided in the optical transmitter of this preferred embodiment searches for respective bias voltages to be applied to the first and second optical modulators 101 and 102, and the optical phase regulator 103 in a state where the modulation signal drive unit 2 is turned off, namely, in a state where no modulation signal is input to the optical modulation unit 100 (hereinafter described as an initial state). That is, the controller 200 determines values of bias voltages output from the bias applying units 202a, 202b and 202c. In this initial state, the process of determining the respective values of the bias voltages to be applied to the first and second optical modulators 101 and 102, and the optical phase regulator 103 is referred to as an initial value search.

In this specification, an initial bias voltage to be applied to the first optical modulator 101, which is determined by the initial value search, is referred to as Vi, an initial bias voltage applied to the second optical modulator 102, which is determined by the initial value search, is referred to as Vq, and an initial bias voltage to be applied to the optical phase regulator 103, which is determined by the initial value search, is referred to as Vps.

A CW light beam output from the light source 1 passes through the optical waveguide 105a to input to the optical modulation unit 100. Thereafter, the optical waveguide 105a is branched into the optical waveguide 105b and the optical waveguide 105c in the branch unit 106a, and respective light beams are input to the first optical modulator 101 and the second optical modulator 102. The first and second optical modulators 101 and 102 each give light intensity variation resulting from the refractive index variation to the input light beam, to output the input light beam as described later. The light beam output from the first optical modulator 101 is input to the optical waveguide 105d. The light beam output from the second optical modulator passes through the optical waveguide 105e, to be changed in phase by the optical phase regulator 103, and is thereafter input to the optical waveguide 105f. The light beams of the optical waveguide 105d and the optical waveguide 105f are multiplexed in a multiplexer 106b to be output from the optical modulation unit 100 through the optical waveguide 105g as a combined light beam.

The monitor 204 provided in the controller 200 monitors the intensity of the combined light beam that passes through the optical waveguide 105g, as a voltage signal. Specifically, a part of the combined light beam drawn to the light intensity detector 104 is converted into a current signal according to the light intensity. The current signal is converted into a voltage signal by the current voltage converter 3, to be input to the monitor 204.

The synchronization detector 201 obtains initial bias voltages Vi and Vq applied to the first and second optical modulators 101 and 102 as an initial value search state, based on the voltage signal input to the monitor 204. After the initial values of the bias voltages are determined in the initial value search state, the state is shifted to a normal state. In the normal state, the modulation signal drive unit 2 is turned on, so that a modulation signal is input to the optical modulation unit 100, and the controller 200 controls the bias voltages.

A process in the controller 200 is a digital signal process. The monitor 204 converts and monitors the input voltage signal from an analog signal into a digital signal by using an ADC (analog-to-digital converter). Similarly, the bias applying units 202a, 202b and 202c each output a bias voltage which is converted from a digital signal to an analog signal by using a DAC (digital-to-analog converter). The synchronization detector 201 performs control for respective bias control for the first and second optical modulators 101 and 102 in time series.

FIG. 2 is a flowchart of a bias voltage control method of the optical transmitter according to this preferred embodiment. FIG. 3 is a detailed flowchart of Step S102 in FIG. 2. That is, FIG. 3 is a flowchart of the bias voltage control method of the first optical modulator 101 (i.e., Ich bias voltage).

After the light source 1 starts up, and a light beam whose light level is normal is input to the optical modulation unit 100, the controller 200 starts an initial value search. Before the initial value search is performed, a convergence point is not known at all. First, the controller 200 turns off the modulation signal drive unit 2 as an initial state (Step S101). That is, as a start state of the initial value search, the synchronization detector 201 allows an analog modulation signal not to be input from the modulation signal drive unit 2 to each of the first and second optical modulators 101 and 102.

In this specification, the respective bias voltages to be applied to the first and second optical modulators 101 and 102, and the optical phase regulator 103 are described as an Ich bias voltage, a Qch bias voltage, and a PS bias voltage. Additionally, the respective output light beams output from the first optical modulator 101 and the second optical modulator 102 are described as an Ich light beam and a Qch light beam. The multiplexed output light (i.e., the output light beam of the optical modulation unit 100) will be described as a combined light beam. In this preferred embodiment, Ich is allocated to the first optical modulator 101, and Qch is allocated to the second optical modulator 102. However, respective reversed channels may be allocated.

In Step S102, the controller 200 performs an initial value search for the Ich bias voltage. In Step S102 of FIG. 2 (i.e., Steps S1011 to S1015 of FIG. 3), the Qch bias voltage and the PS bias voltage each are an arbitrary fixed value. In order to monitor the level of the combined light beam of the optical modulation unit 100, the monitor 204 monitors a voltage signal output from the current voltage converter 3. The synchronization detector 201 searches for an Ich bias voltage, at which the intensity of the combined light beam of the optical modulation unit 100 becomes maximum, based on the voltage signal monitored by the monitor 204, and determines the Ich bias voltage as Vi1 (Step S1011). Then, the synchronization detector 201 varies the Ich bias voltage, searches for an Ich bias voltage, which is the closest to Vi1 (i.e., adjacent to Vi1), and at which the intensity of the combined light beam of the optical modulation unit 100 becomes local maximum, and determines the Ich bias voltage as Vi2 (Step S1012).

It is determined whether or not a difference between Vi1 and Vi2 is smaller than a predetermined threshold value (e.g., 1.2 Vπ) (Step S1013). In a case where the difference between Vi1 and Vi2 is smaller than the threshold value, a value obtained by adding Vi1 to Vi2 and dividing the resulting value by two is set as an initial bias voltage Vi in the first optical modulator 101 (Step S1015), and Ich bias voltage control is terminated.

On the other hand, in a case where the difference between Vi1 and Vi2 is larger than the threshold value, the process proceeds to Step S1014. In Step S1014, the value of the Qch bias voltage or the PS bias voltage is changed, and the process returns to Step S1011 to repeat the initial value search for the Ich bias voltage. In Step S1013, the reason why the difference between Vi1 and Vi2 is compared with the threshold value will be described later.

Thus, Step S102 of FIG. 2 is terminated. Now, Step S103 of FIG. 2 will be described. Step S103 is performed in a state where the initial bias voltage Vi obtained in Step S102 is applied to the first optical modulator 101. In this state, the Ich light beam is in an extinction state, and therefore a combined light beam output from the optical modulation unit 100 is regarded as Qch light beam. Therefore, in Step S103, in order to find a Qch bias voltage at which the Qch light beam is in an extinction state, a Qch bias voltage at which the combined light beam output from the optical modulation unit 100 becomes extinct is searched. The searched Qch bias voltage is set as an initial bias voltage Vq in the second optical modulator 102.

Thus, the initial value search is terminated. In the normal state, the initial bias voltages Vi and Vq are set as the respective bias voltages to be applied to the first and second optical modulators 101 and 102. Then, the modulation signal drive unit 2 is turned on, an analog modulation signal is input to each of the first and second optical modulators 101 and 102. Consequently, the optical modulation unit 100 is brought into a state of modulation.

Hereinafter, the reason why the difference between Vi1 and Vi2 is compared with the threshold value in Step S1013 of FIG. 3 will be described.

With reference to FIGS. 4A to 4D, a case where a phase difference between the Ich light beam and the Qch light beam is present will be described. FIGS. 4A to 4C show light vectors of the Ich light beam, the Qch light beam, and the combined light beam (FIG. 4A), the intensity of the combined light beam (FIG. 4B), and the intensity of the Ich light beam (FIG. 4C) when the Ich bias voltage is changed while the Qch bias voltage and the PS bias voltage are still fixed. The arrows and the dotted lines in the figures are corresponded.

From FIG. 4A and FIG. 4B, when the Ich bias voltage is Vi1, the magnitude of the light vector of the Ich light beam becomes maximum, and the intensity of the combined light beam becomes maximum. When the Ich bias voltage is Vi2, the light vector of the Ich light beam is directed to a direction opposite to the direction when the Ich bias voltage is Vi1. Additionally, the intensity of the combined light beam becomes local maximum. As shown in FIG. 4C, the light vector of the Ich light beam shows a behavior of a sine wave for the Ich bias voltage. That is, as shown in FIG. 4C, when a just intermediate bias voltage between Vi1 and Vi2 is applied as the Ich bias voltage, the Ich light beam is brought into an extinction state (Null point). In a case where the Ich light beam is in the extinction state, the combined light beam output from the optical modulation unit 100 becomes the Qch light beam (FIG. 4D).

Figure 5:
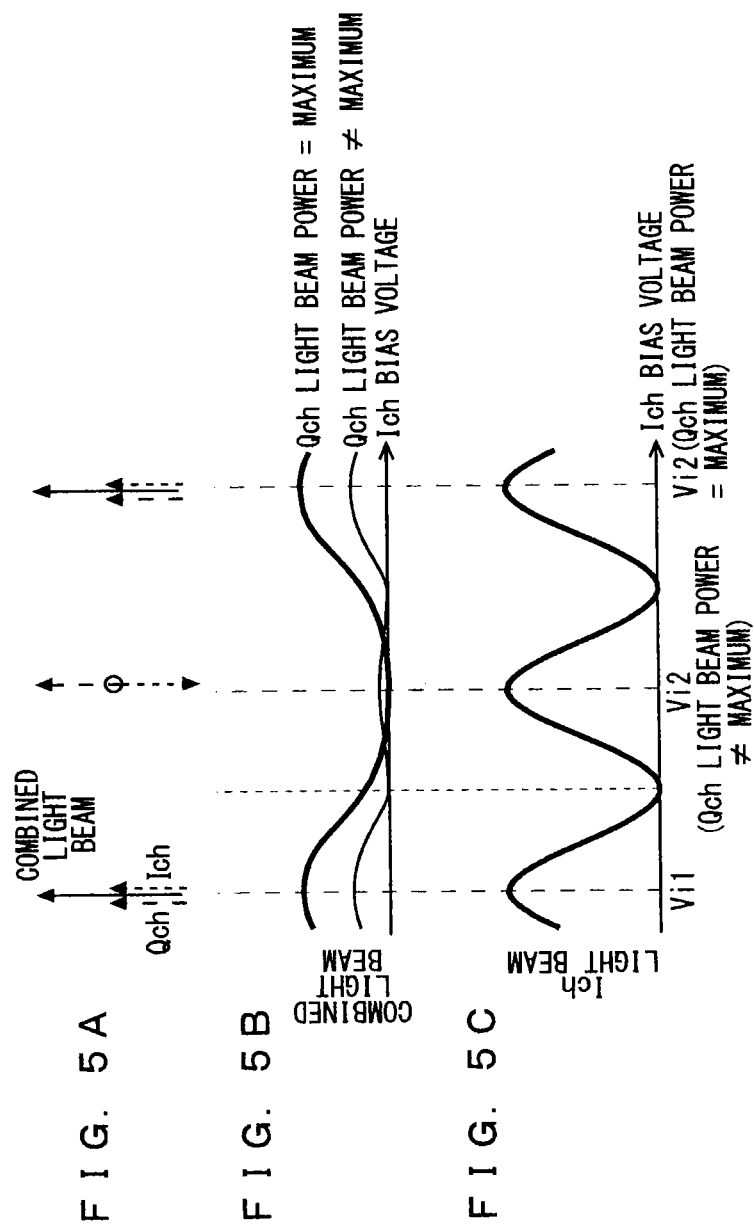
FIGS. 5A to 5C are views each illustrating the Ich bias voltage control method of the optical transmitter according to the first preferred embodiment.

With reference to FIGS. 5A to 5C, a case where the phase difference between the Ich light beam and the Qch light beam is not present will be described. FIGS. 5A to 5C show light vectors of the Ich light beam, the Qch light beam, and the combined light beam (FIG. 5A), the intensity of the combined light beam (FIG. 5B), and the intensity of the Ich light beam (FIG. 5C) when the Ich bias voltage is changed while the Qch bias voltage and the PS bias voltage are still fixed.

From FIG. 5A and FIG. 5B, in a case where the intensity of the Qch light beam is maximum, a local maximum point as in FIG. 4B cannot be detected, and an incorrect bias voltage is set as Vi2. At this time, an Ich light beam in a case where Vi1 is applied as the Ich bias voltage, and an Ich light beam in a case where Vi2 is applied as the Ich bias voltage are in the same state. Therefore, even when the just intermediate bias voltage between Vi1 and Vi2 is set as the initial value of the Ich bias voltage, the Ich light beam is not brought into the extinction state. Accordingly, in this case, when Vi2 is incorrectly set, an incorrect initial value Vi is set.

The above error of the initial value is generated only when the Ich light beam and the Qch light beam have the same phase or opposite phases, and the intensity of the Qch light beam is maximum. The reason why Step S1013 of FIG. 3 is provided is that it is necessary to prevent this initial value error. In a case where Vi2 is correctly set in Step S1012, the difference between Vi1 and Vi2 becomes Vπ (half-wavelength voltage determined for each modulator) (FIG. 4B). On the other hand, in a case where Vi2 is incorrectly set, the difference between Vi1 and Vi2 becomes 2Vπ (FIG. 5B). Therefore, in Step S1013, a threshold value is preset, and it is determined whether or not an absolute value of the difference between Vi1 and Vi2 is smaller than the preset threshold value, so that Vi2 is prevented from being incorrectly set. The threshold value is simply appropriately set in a range from a value larger than Vπ to a value smaller than 2 times of Vπ, based on given Vπ of the first optical modulator 101, and may be set to, for example, 1.2 times Vπ (1.2Vπ).

Conventionally, each of the Ich bias voltage, the Qch bias voltage, and the PS bias voltage is varied in the range of 2Vπ, and optical output from the optical modulation unit 100 is monitored. For example, when monitoring is performed while each bias voltage is changed in 32 ways, the number of combinations of monitoring points is 32×32×32=32768 ways. In the method of this preferred embodiment, for example, the Ich bias voltage is changed in 256 ways in the range of 4Vπ, the initial value of the Ich bias voltage is determined, and thereafter, the Qch bias voltage is changed in 256 ways in the range of 4Vπ. In this preferred embodiment, when one of the bias voltages is controlled, the other bias voltage is fixed. Therefore, when the combinations of the bias voltages are monitored in 256+256=512 ways, the initial values of the Ich bias voltage and the Qch bias voltage can be determined. That is, the initial value search can be completed at a higher speed.

<Effects>

The optical transmitter according to this preferred embodiment is an optical transmitter including: the optical modulation unit 100 that modulates an incident light beam; a modulation signal drive unit 2 that inputs a modulation signal to the optical modulation unit 100; and a controller 200 that controls the optical modulation unit 100 and the modulation signal drive unit 2, wherein the optical modulation unit 100 includes: the branch unit 106a that branches a light beam incident from a light source 1 into two light beams; two mach-zehnder optical modulators (first and second optical modulators 101 and 102) that modulate the respective two light beams based on applied bias voltages and input modulation signals; the optical phase regulator 103 that is connected to either of the two optical modulators, and regulates a phase of the light beam incident on the optical modulator based on an applied bias voltage; the multiplexer 106b that multiplexes output light beams from the two optical modulators and outputs a multiplexed light beam; and a light intensity detector 104 that detects intensity of the light beam output from the multiplexer 106b, the modulation signal drive unit 2 inputs the modulation signal to each of the two optical modulators, wherein the controller 200 is a controller 200 that searches and determines bias voltages to be applied to the two optical modulators in an initial state as a state where the modulation signals are not input, and determines a bias voltages to be applied to the other optical modulator as a first initial bias voltage (i.e., the initial bias voltage Vi to be applied to the first optical modulator 101), in a state where the modulation signal is not input to each of the two optical modulators, while keeping bias voltages to be applied to one optical modulator (second optical modulator 102) of the two optical modulators and the optical phase regulator 103 constant, such that an output light beam from the other optical modulator (first optical modulator 101) of the two optical modulators becomes zero, based on the intensity of the light beam detected by the light intensity detector 104, and thereafter, the controller 200 determines a bias voltage to be applied to the one optical modulator as a second initial bias voltage (i.e., the initial bias voltage Vq to be applied to the second optical modulator 102) such that an output light beam from the one optical modulator becomes zero, based on the intensity of the light beam detected by the light intensity detector 104, while applying the first initial bias voltage to the other optical modulator, and keeping the bias voltage to be applied to the optical phase regulator 103 constant.

Therefore, in the optical transmitter of this preferred embodiment, the bias voltages to be applied to the second optical modulator 102 and the optical phase regulator 103 are fixed to fixed values, when the initial bias voltage Vi of the first optical modulator 101 is searched for. Then, when the initial bias voltage Vq of the second optical modulator 102 is searched for after the initial bias voltage Vi of the first optical modulator 101 is determined, the value of the bias voltages to be applied to the first optical modulator 101 and the optical phase regulator 103 are fixed to fixed values. Accordingly, the optical transmitter according to this preferred embodiment does not perform the search while changing the bias voltages of the first and second optical modulators 101 and 102 at the same time, but searches for the bias voltage of the other optical modulators in a state where the bias voltage of the one optical modulator is fixed, and therefore the search for the initial bias voltage can be completed at a higher speed.

In the optical transmitter according to this preferred embodiment, the controller 200 searches for a bias voltage (Vi1), at which the intensity of the light beam detected by the light intensity detector 104 becomes maximum, and a bias voltage (Vi2), which is adjacent to the bias voltage (Vi1), and at which the intensity of the light beam detected by the light intensity detector 104 is local maximum, by changing the bias voltage to be applied to the other optical modulator (first optical modulator 101), and determines a value obtained by adding the two bias voltages (Vi1 and Vi2) and dividing a resulting value by two, as the first initial bias voltage (i.e., initial bias voltage Vi) at which the output light beam from the other optical modulator (first optical modulator 101) becomes zero.

Accordingly, the bias voltage of the other optical modulator (first optical modulator 101) is controlled in a state where the bias voltages of the one optical modulator (second optical modulator 102) and the optical phase regulator 103 are fixed, thereby enabling a state where the light beam from the first optical modulator 101 is not output. First, the state where the light beam from the first optical modulator 101 is not output is provided, and thereafter the bias voltage of the second optical modulator 102 can be easily controlled.

In the optical transmitter according to this preferred embodiment, in a case where a difference between the two bias voltages (i.e., Vi1 and Vi2) exceeds a predetermined threshold value, the controller 200 changes and searches again the bias voltage to be applied to the one optical modulator (second optical modulator 102) or the optical phase regulator 103.

Accordingly, in a case where the difference between Vi1 and Vi2 becomes $2V\pi$, the initial bias voltage Vi is set to an incorrect value. In order to avoid this, whether or not the difference between Vi1 and Vi2 exceeds, for example, $1.2V\pi$ is searched, and, in a case where the difference exceeds $1.2V\pi$, the searches are performed again. Consequently, the initial bias voltage Vi can be set to a correct value.

In the optical transmitter according to this preferred embodiment, the predetermined threshold value is a value that is larger than a $\pi$ shift voltage determined in the other optical modulator (first optical modulator 101), and is smaller than 2 times that of the $\pi$ shift voltage.

Accordingly, in a case where the initial bias voltage is correctly set, the difference between Vi1 and Vi2 becomes $V\pi$. On the other hand, in a case where the initial bias voltage is incorrectly set, the difference between Vi1 and Vi2 becomes $2V\pi$. Accordingly, the threshold value is set to a point between $V\pi$ and $2V\pi$, for example, $1.2V\pi$, so that it is possible to determine whether or not the initial bias voltage Vi is correctly set.

A control method of an optical transmitter according to this preferred embodiment is a control method of an optical transmitter, the optical transmitter including: an optical modulation unit 100 that modulates an incident light beam; a modulation signal drive unit 2 that inputs a modulation signal to the optical modulation unit 100; and a controller 200 that controls the optical modulation unit 100 and the modulation signal drive unit 2, wherein the optical modulation unit 100 includes: a branch unit 106a that branches a light beam incident from a light source 1 into two light beams; two mach-zehnder optical modulators (first and second optical modulators 101 and 102) that modulate the respective two light beams based on applied bias voltages and input modulation signals; an optical phase regulator 103 that is connected to either of the two optical modulators, and regulates a phase of the light beam incident on the optical modulator based on an applied bias voltage; a multiplexer 106b that multiplexes output light beams from the two optical modulators and outputs a multiplexed light beam; and a light intensity detector 104 that detects intensity of the light beam output from the multiplexer 106b, wherein the modulation signal drive unit 2 inputs the modulation signal to each of the two optical modulators (first and second optical modulators 101 and 102), and the control method of an optical transmitter including: (a) turning, by the controller 200, the modulation signal to be input to the two optical modulators off; (b) keeping, by the controller 200, bias voltages to be applied to one optical modulator (second optical modulator 102) of the two optical modulators and the optical phase regulator 103 constant, after the (a); (c) determining, by the controller 200, a bias voltage to be applied to the other optical modulator as a first initial bias voltage (i.e., the initial bias voltage Vi to be applied to the first optical modulator 101) such that an output light beam from the other optical modulator (first optical modulator 101) of the two optical modulators becomes zero, based on the intensity of the light beam detected by the light intensity detector 104, after the (b); and (d) determining, by the controller 200, a bias voltage to be applied to the one optical modulator as a second initial bias voltage (i.e., the initial bias voltage Vq to be applied to the second optical modulator 102) such that an output light beam from the one optical modulator (second optical modulator 102) becomes zero, based on the intensity of the light beam detected by the light intensity detector 104, while applying the first initial bias voltage to the other optical modulator (first optical modulator 101), and keeping the bias voltage to be applied to the optical phase regulator constant 103, after the (c).

Accordingly, in the control method of an optical transmitter according to this preferred embodiment, when the initial bias voltage Vi of the first optical modulator 101 is searched, the bias voltages to be applied to the second optical modulator 102 and the optical phase regulator 103 are fixed to the fixed values. Then, when the initial bias voltage Vq of the second optical modulator 102 is searched for after the initial bias voltage Vi of the first optical modulator 101 is determined, values of the bias voltages to be applied to the first optical modulator 101 and the optical phase regulator 103 are fixed to the fixed values. Accordingly, in the control method of an optical transmitter according to this preferred embodiment, the bias voltages of the first and second optical modulators 101 and 102 are not searched for while being changed at the same time, but the bias voltage of the other optical modulators is searched in a state where the bias voltage of the one optical modulator is fixed, and therefore the search for the initial bias voltage can be completed at a higher speed.

Second Preferred Embodiment

<Configuration>

The optical transmitter according to the first preferred embodiment monitors the output of the optical modulation unit 100 in an initial state where no modulation signal is input to the optical modulation unit 100, and searches for the initial bias voltages of the first and second optical modulators 101 and 102 such that the light beam output from the optical modulation unit 100 is brought into the most extinction state. An optical transmitter according to this preferred embodiment searches initial values (initial bias voltages Vi and Vq) of an Ich bias voltage and a Qch bias voltage such that a light beam output from an optical modulation unit 100 is brought into the most extinction state, in an initial state where no modulation signal is input to the optical modulation unit 100, similarly to the first preferred embodiment.

FIG. 6 is a function block diagram of the optical transmitter according to this preferred embodiment. The optical transmitter according to this preferred embodiment further includes low-frequency signal generators 203a and 203b, unlike the optical transmitter according to the first preferred embodiment (FIG. 1). The low-frequency signal generator 203a superimposes a low-frequency signal on an Ich bias voltage through an adder 205a. Similarly, the low-frequency signal generator 203b superimposes a low-frequency signal on a Qch bias voltage through an adder 205b. Other configurations are identical with those of the first preferred embodiment (FIG. 1), and therefore description will be omitted.

<Operation>

With reference to the flowchart (FIG. 2 and FIG. 3) used in the first preferred embodiment, a bias voltage control method of the optical transmitter according to this preferred embodiment will be described. Step S101 in FIG. 3 is similar to the first preferred embodiment, and therefore description will be omitted. With reference to FIG. 3, Step S102 of FIG. 2 will be described. In Step S102 of FIG. 2, the low-frequency signal generator 203a is turned on, and the adder 205a superimposes a low frequency minute signal on an Ich bias voltage output from a bias applying unit 202a. In Step S102, the low-frequency signal generator 203b is in an off state.

First, in Step S1011 of FIG. 3, an Ich bias voltage, at which the intensity of a combined light beam becomes maximum, is searched for, and is determined as Vi1, similarly to the first preferred embodiment. A controller 200 obtains a combined light beam output from the optical modulation unit 100 with a light intensity detector 104. Furthermore, a monitor 204 monitors a minute modulation signal component through a current voltage converter 3. The monitor 204 monitors an electric signal output from the current voltage converter 3 from an analog signal into a digital signal, by using an ADC. Alternatively, the monitor 204 monitors a low frequency minute modulation signal as a low-frequency signal included in a voltage signal output from the current voltage converter 3. At this time, a time average value of the minute modulation signal components becomes 0 when optical output is local maximum, or local minimum. That is, in Step S1011, a synchronization detector 201 changes the Ich bias voltage while superimposing the low-frequency signal on the Ich bias voltage. As a response to this, a time average value of the optical output is fed back to the synchronization detector 201, and the Ich bias voltage is determined such that the time average value becomes 0. A cycle of this time average may be the same as, for example, a cycle of a low frequency output by the low-frequency signal generator. The time average value of the minute modulation signal components obtained from the optical output is referred to as an error signal. That is, a search for the Ich bias voltage is performed such that the error signal becomes 0, and a value of this Ich bias voltage is determined as Vi1.

In Step S1012 of FIG. 3, an Ich bias voltage, which is adjacent to WI, and at which the intensity of the combined light beam becomes local maximum, is searched for, and determined as Vi2, similarly to the first preferred embodiment. The combined light beam becomes local maximum, when the error signal is 0. Accordingly, the Ich bias voltage is determined such that the error signal becomes 0.

After a predetermined time elapses after Step S102 of FIG. 2, the process advances to Step S103. In Step S103, an initial value search for the Qch bias voltage is performed. First, the low-frequency signal generator 203a is turned off, and the low-frequency signal generator 203b is turned on. A PS bias voltage is fixed to a fixed value, and the Ich bias voltage is fixed to Vi. That is, a low frequency minute signal is superimposed only on the Qch bias voltage. Then, the Qch bias voltage is searched for such that combined light beam output from the optical modulation unit 100 becomes the most extinct, and is determined as an initial bias voltage Vq. Thus, the initial value search is terminated.

<Effects>

In the optical transmitter according to this preferred embodiment, the controller 200 further includes the low-frequency signal generators 203a and 203b that superimpose low-frequency signals on the respective bias voltages to be applied to the two optical modulators (first and second optical modulators 101 and 102).

Accordingly, the low-frequency signal is superimposed on the Ich bias voltage, and the initial bias voltage Vi is determined based on the error signal of the combined light beam, so that the initial bias voltage Vi can be more accurately searched. Similarly, the low-frequency signal is superimposed on the Qch bias voltage, and the initial bias voltage Vq is determined based on the error signal of the combined light beam, so that the initial bias voltage Vq can be more accurately searched.

Third Preferred Embodiment

<Configuration>

The optical transmitter according to each of the first preferred embodiment and the second preferred embodiment monitors the output of the optical modulation unit 100 in an initial state where no modulation signal is input to the optical modulation unit 100, and searches for the initial bias voltages Vi and Vq of the first and second optical modulators 101 and 102 such that the light beam output from the optical modulation unit 100 is brought into the most extinction state.

An optical transmitter according to this preferred embodiment searches for initial bias voltages Vi and Vq such that a light beam output from an optical modulation unit 100 is brought into the most extinction state, in an initial state where no modulation signal is input to the optical modulation unit 100, similarly to the first preferred embodiment and the second preferred embodiment. This preferred embodiment is different from the first preferred embodiment and the second preferred embodiment in that a PS bias voltage is first determined, and thereafter, initial values of an Ich bias voltage and a Qch bias voltage are searched for. A configuration of the optical transmitter according to this preferred embodiment is the same as that of the optical transmitter according to the second preferred embodiment (FIG. 6), and therefore description of the configuration of the optical transmitter will be omitted.

<Operation>

Figure 7:
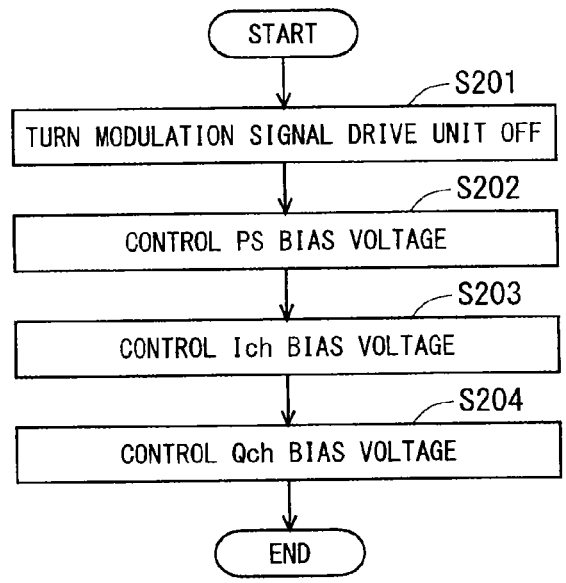
FIG. 7 is a flowchart of a bias voltage control method of the optical transmitter of third preferred embodiment and an optical transmitter of a fourth preferred embodiment.

FIG. 7 is a flowchart of a bias voltage control method of the optical transmitter according to this preferred embodiment. After a light source 1 starts up, and a light beam whose light level is normal is input to the optical modulation unit 100, a controller 200 starts an initial value search. Before the initial value search is performed, a convergence point is not known at all. First, the controller 200 turns off a modulation signal drive unit 2 as an initial state (Step S201). That is, as a start state of the initial value search, a synchronization detector 201 allows an analog modulation signal not to be input from the modulation signal drive unit 2 to each of first and second optical modulators 101 and 102.

In Step S202, a PS bias voltage is controlled. First, the controller 200 turns on a low-frequency signal generator 203a, and superimposes a low-frequency signal on an Ich bias voltage. Furthermore, the controller 200 turns on a low-frequency signal generator 203b, and superimposes a low-frequency signal obtained by shifting by $\pi/2$ phase from the low-frequency signal superimposed on the Ich bias voltage, on a Qch bias voltage. The synchronization detector 201 performs the feedback control of the PS bias voltage such that an error signal detected by a monitor 204 becomes 0, and determines this PS bias voltage as Vps.

In this state, a phase difference between an Ich light beam and a Qch light beam is in a state of either $\pi/2$ or $-\pi/2$. That is, at this time, the Ich light beam and the Qch light beam have mutually independent relation. Hence, in an independent state, for example, a variation amount of an output light beam from the optical modulation unit 100 when the Qch bias voltage is fixed, and only the Ich bias voltage is varied shows a variation amount of the Ich light beam. Therefore, when the initial value searches for the Ich bias voltage and the Qch bias voltage are performed in subsequent Steps S203 and S204, output light beams of the first and second optical modulators 101 and 102 can be independently controlled while a combined light beam from the optical modulation unit 100 is monitored.

In Step S203, an initial value search for the Ich bias voltage is performed. First, while the low-frequency signal generator 203a is kept on, the low-frequency signal generator 203b is turned off. The PS bias voltage is fixed to Vps. That is, a low frequency minute signal is superimposed only on the Ich bias voltage. Then, the Ich bias voltage is searched for such that the combined light beam output from the optical modulation unit 100 becomes the most extinct, and is determined as an initial bias voltage Vi.

After a predetermined time elapses after Step S203, the process proceeds to Step S203. In Step S203, an initial value search for the Qch bias voltage is performed. First, the low-frequency signal generator 203a is turned off, and the low-frequency signal generator 203b is turned on. The PS bias voltage is fixed to Vps, and the Ich bias voltage is fixed to Vi. That is, a low frequency minute signal is superimposed only on the Qch bias voltage. Then, the Qch bias voltage is searched for such that the combined light beam output from the optical modulation unit 100 becomes the most extinct, and is determined as an initial bias voltage Vq.

Thus, initial bias voltages Vps, Vi and Vq applied to an optical phase regulator 103, and the first and second optical modulators 101 and 102 are determined, and therefore the initial value search is terminated. In the normal state, respective initial values of the Ich bias voltage and the Qch bias voltage are set to Vi and Vq. Then, the modulation signal drive unit 2 is turned on, an analog modulation signal is input to each of the first and second optical modulators 101 and 102. Consequently, the optical modulation unit 100 is brought into a state of modulation.

<Effects>

In the optical transmitter according to this preferred embodiment, the controller 200 determines the bias voltage to be applied to the optical phase regulator 103 such that a phase difference between the output light beams from the two optical modulators (first and second optical modulators 101 and 102) becomes $\pi/2$, and determines the first and second initial bias voltages (i.e., the initial bias voltage Vi to be applied to the first optical modulator 101, and the initial bias voltage Vq to be applied to the second optical modulator 102) while applying the determined bias voltage to the optical phase regulator 103.

Accordingly, in the initial value search, the bias voltage (PS bias voltage) to be applied to the optical phase regulator 103 is first regulated such that the phase difference between the output light beams from the first and second optical modulators 101 and 102 is becomes $\pi/2$. Consequently, the output light beams from the first and second optical modulators 101 and 102 become orthogonal with each other, so that the bias voltages of the first and second optical modulators 101 and 102 can be independently controlled.

In the optical transmitter according to this preferred embodiment, the controller 200 includes the low-frequency signal generators 203a and 203b that generate low-frequency signals, and the controller 200 determines the bias voltage to be applied to the optical phase regulator 103 such that the phase difference between the output light beams from the two optical modulators becomes $\pi/2$, in a state where low-frequency signals are superimposed on the respective bias voltages to be applied to the two optical modulators (first and second optical modulators 101 and 102).

Accordingly, in a state where respective low-frequency signals are superimposed on the bias voltages to be applied to the first and second optical modulators 101 and 102, the bias voltage (PS bias voltage) to be applied to the optical phase regulator 103 is regulated, so that the phase difference can be made to be $\pi/2$ at a high speed.

Fourth Preferred Embodiment

The optical transmitter according to the third preferred embodiment monitors the combined light beam output from the optical modulation unit 100 as an initial state where no modulation signal is input to the optical modulation unit 100, and searches for the initial bias voltages such that the combined light beam output from the optical modulation unit 100 is brought into the most extinction state.

An optical transmitter according to this preferred embodiment searches for initial bias voltages Vps, Vi and Vq in the order of a PS bias voltage, an Ich bias voltage, and a Qch bias voltage such that a light beam output from an optical modulation unit 100 is brought into the most extinction state, in an initial state where no modulation signal is input to the optical modulation unit 100, similarly to the third preferred embodiment. The optical transmitter according to this preferred embodiment is different from the second preferred embodiment in a search method for the PS bias voltage.

<Configuration>

Figure 8:
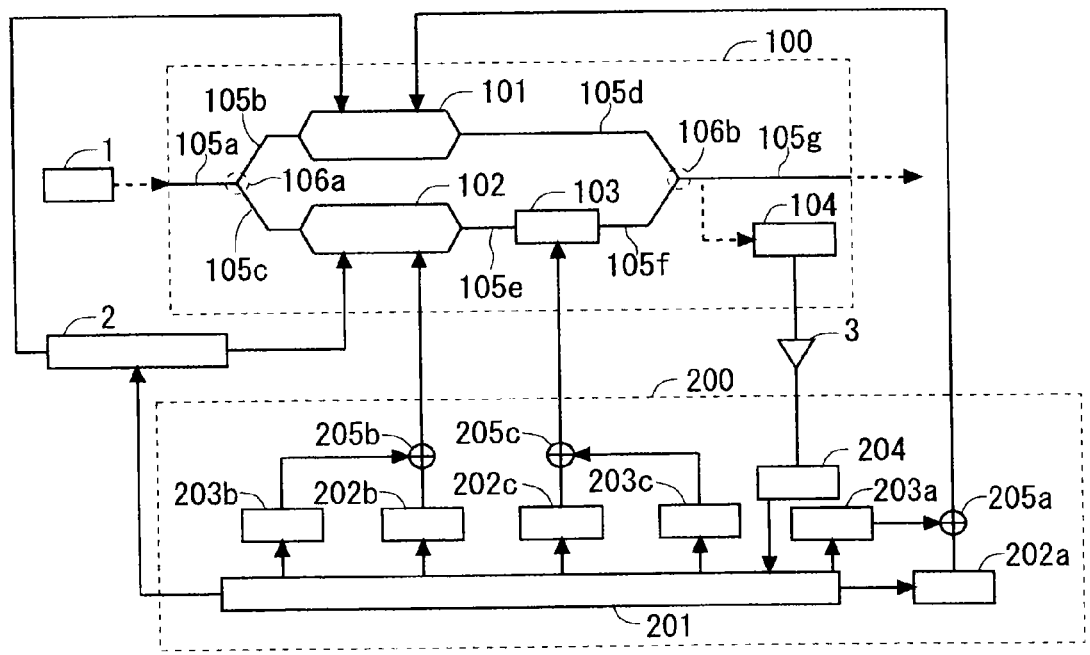
FIG. 8 is a block diagram of the optical transmitter according to the fourth preferred embodiment.

FIG. 8 is a block diagram of the optical transmitter according to this preferred embodiment. In FIG. 8, added units from the second preferred embodiment and the third preferred embodiment (FIG. 6) are a low-frequency signal generator 203c and an adder 205c. The low-frequency signal generator 203c superimposes a low-frequency signal on a PS bias voltage to be applied to an optical phase regulator 103 through the adder 205c. Other configurations are identical with those of the second preferred embodiment and third preferred embodiment, and therefore description thereof will be omitted.

<Operation>

Now, operation will be described. A current voltage converter 3 converts a current signal in accordance with light intensity from a light intensity detector 104 into a voltage signal, this output voltage signal is input to a monitor 204 inside a controller 200, and a monitor 204 monitors a low frequency minute modulation signal as a low-frequency signal included in the voltage signal output from the current voltage converter 3. A synchronization detector 201 extracts an error signal from the voltage signal input to the synchronization detector 201 through the monitor, to obtain such a bias voltage, at which this error signal becomes 0, by computing. Bias applying units 202a, 202b and 202c each output a bias voltage based on the error signal extracted by the synchronization detector 201 through the monitor 204.

Respective outputs from the bias applying units 202a, 202b and 202c are added to minute modulation signals as low-frequency signals from low-frequency signal generator 203a, 203b and 203c by adders 205a, 205b and 205c, to be input to first and second optical modulators 101 and 102, and the optical phase regulator 103.

In FIG. 8, the process in the synchronization detector 201 is a digital signal process, and therefore the monitor 204 converts the input voltage signal from an analog signal into a digital signal by using an ADC (Analog-to-Digital Converter) to perform monitoring. Similarly, the bias applying units 202a, 202b and 202c output bias voltages each obtained by converting a digital signal into an analog signal by using a DAC (Digital-to-Analog Converter). The synchronization detector 201 independently controls the respective biases for the first and second optical modulators 101 and 102, and the optical phase regulator 103 in time series. The processes will be described later.

Figure 9:
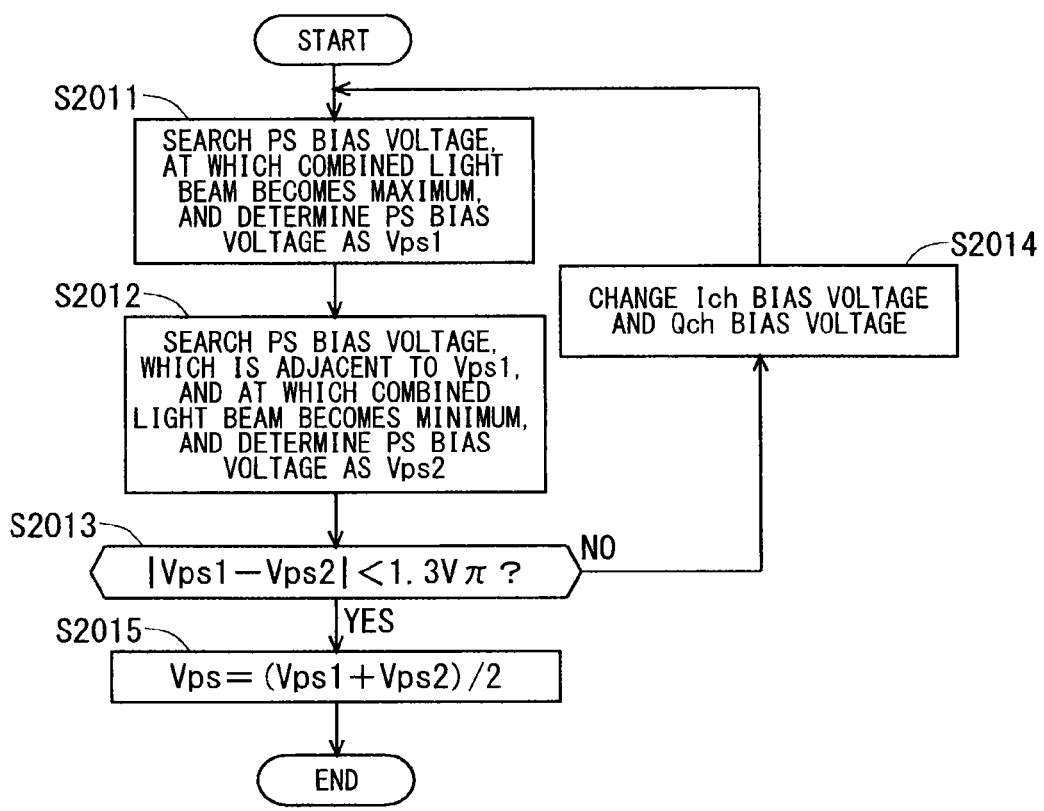
FIG. 9 is a flowchart of a PS bias voltage control method of the optical transmitter according to the fourth preferred embodiment.

FIG. 7 is a flowchart of a bias voltage control method of the optical transmitter according to this preferred embodiment. FIG. 9 is a detailed flowchart of Step S202 in FIG. 7. That is, FIG. 9 is a flowchart of an initial value search method of the bias voltage of the optical phase regulator 103.

After a light source 1 starts up, and a light beam whose light level is normal is input to the optical modulation unit 100, the controller 200 starts bias control. Before the bias control is performed, a convergence point is not known at all.

First, as a start state of the initial value search, the synchronization detector 201 allows an analog modulation signal not to be input from a modulation signal drive unit 2 to each of first and second optical modulators 101 and 102. That is, the bias control is started in a state where the modulation signal drive unit 2 is in an off state (Step S201 of FIG. 7).

In Step S202 of FIG. 7, the synchronization detector 201 performs an initial value search for the PS bias voltage. The synchronization detector 201 turns on the low-frequency signal generator 203c, and superimposes a low frequency minute signal on a bias applied to the optical phase regulator 103.

Then, the bias voltage to be applied to the optical phase regulator 103 is controlled such that the intensity of a combined light beam output from the optical modulation unit 100 becomes maximum. The PS bias voltage output from the bias applying unit 202c, which is determined during this control, is defined as Vps1 (Step S2011 of FIG. 9).

After a predetermined time elapses, the bias voltage to be applied to the optical phase regulator is controlled such that the intensity of the combined light beam output from the optical modulation unit 100 becomes the most extinct, while the low frequency minute signal is still superimposed on the bias voltage to be applied to the optical phase regulator 103. The PS bias voltage output from the bias applying unit 202c, which is determined during this control, is defined as Vps2 (Step S2012 of FIG. 9). Vps2 is determined so as to be adjacent to Vps1.

As described above, the optical phase regulator 103 controls a phase difference between the output light beams of the first and second optical modulators 101 and 102. When the intensity of the combined light beam output from the optical modulation unit 100 is maximum by the control of the optical phase regulator 103, the light beams output from the first and second optical modulators 101 and 102 have the same phase. On the other hand, when the combined light beam output from the optical modulation unit 100 is in an extinction state, the light beams output from the first and second optical modulators 101 and 102 have opposite phases.

At a time point when the control of Step S2011 is started, in a case where optical output from the first optical modulator 101 and the second optical modulator 102 is in the extinction state, control to a bias voltage at which the intensity of the combined light beam output from the optical modulation unit 100 becomes maximum cannot be attained, even when the optical phase regulator 103 performs the bias control.

Therefore, it is determined whether or not a difference between the two bias voltages, namely the PS bias voltages Vps1 and Vps2, which are determined in Steps S2011 and S2012 is largely deviated from Vπ set in the first and second optical modulators 101 and 102 (Step S2013 of FIG. 9). That is, in Step S2013, it is determined whether or not the difference between the two bias voltages Vps1 and Vps2 is smaller than a predetermined threshold value (e.g., 1.3 times Vπ). In a case where the difference between Vps1 and Vps2 is smaller than the threshold value, a value obtained by adding Vps1 to Vps2 and dividing the resulting value by two is set as an initial bias voltage Vps of the optical phase regulator 103 in Step S2015.

On the other hand, in a case where the difference between Vps1 and Vps2 is larger than the threshold value in Step S2013, the bias voltages to be applied to the first optical modulator 101 and the second optical modulator 102 are changed, a state where the combined light beam is output from the an optical modulation unit 100 is provided, and thereafter, the Step S2011 is performed again.

The performance order of Step S2011 and Step S2012 may be reversed. That is, the order of the searches for Vps1 and Vps2 may be reversed.

Step S2013 is performed, so that Vp1 and Vp2 can be reliably correctly determined. Consequently, Vps can be reliably correctly set in Step S2015.

In a state where the bias voltage Vps is applied to the optical phase regulator 103, the phase difference between the output light beams of the first and second optical modulators 101 and 102 is in a state of either $\pi/2$ or $-\pi/2$. Step S202 (i.e., Step S2011 to S2015 in FIG. 9) in FIG. 7 described above is referred to as PS bias voltage control.

The PS bias voltage control is performed, and the phase difference between the output light beams of the first and second optical modulators 101 and 102 is made to be $\pi/2$ or $-\pi/2$, so that the output light beams from the first and second optical modulators 101 and 102 are independent of each other. Accordingly, the output light beams of the first and second optical modulators 101 and 102 can be easily controlled while the combined light beam output from the optical modulation unit 100 is monitored.

After a predetermined time elapses after the completion of the PS bias voltage control, the process is shifted to bias voltage control (Ich bias voltage control) of the first optical modulator 101 (Step S203 of FIG. 7). In Step S203, the bias voltage to be applied to the optical phase regulator 103 is still fixed to Vps. Additionally, the low-frequency signal generator 203b is turned off, the low-frequency signal generator 203a is turned on, and a low frequency minute signal is superimposed on the bias voltage to be applied to the first optical modulator 101. Then, the Ich bias voltage is controlled such that the combined light beam output from the optical modulation unit 100 becomes the most extinct. The output bias voltage of the bias applying unit 202a, which is determined during this control, is set as an initial bias voltage Vi. Step S203 in FIG. 7 described above is referred to as Ich bias voltage control.

After a predetermined time elapses after the completion of the Ich bias voltage control, the process is shifted to bias voltage control (Qch bias voltage control) of the second optical modulator 102 (Step S204 of FIG. 7). In Step S204, the bias voltage to be applied to the optical phase regulator 103 is still fixed to Vps. Additionally, the bias voltage to be applied to the first optical modulator 101 is still fixed to Vi. The low-frequency signal generator 203a is turned off, the low-frequency signal generator 203b is turned on, and a low frequency minute signal is superimposed on the bias voltage to be applied to the second optical modulator 102. Then, the bias voltage to be applied to the second optical modulator 102 is controlled such that the combined light beam output from the optical modulation unit 100 becomes the most extinct. The output bias voltage of the bias applying unit 202b, which is determined during this control, is set as an initial bias voltage Vq. Step S204 in FIG. 7 described above is referred to as Qch bias voltage control.

Thus, the initial bias voltages Vps, Vi and Vq to be applied to the optical phase regulator 103, the first and second optical modulators 101 and 102 are determined, and therefore the initial value search is terminated. Then, the state is shifted to the next normal state. In the normal state, as the initial values of the Ich bias voltage and the Qch bias voltage, Vi and Vq are set, respectively. Then, the modulation signal drive unit 2 is turned on, and an analog modulation signal is input to each of the first and second optical modulators 101 and 102. Consequently, the optical modulation unit 100 is brought into a state of modulation.

In the first to fourth preferred embodiments, the Qch bias voltage control is performed after the Ich bias voltage control. However, the order of the Ich bias voltage control and the Qch bias voltage control may be reversed. In a case where the Qch bias voltage control is first performed, operation similar to the operation performed in the Ich bias voltage control is performed for the Qch bias voltage in a state where the Ich bias voltage and the PS bias voltage are fixed. Thereafter, operation similar to the operation performed in the Qch bias voltage control is performed for the Ich bias voltage. In the third preferred embodiment and the fourth preferred embodiment, the order of the PS bias voltage control and the Ich bias voltage control cannot be changed. Similarly, the order of the PS bias voltage control and the Qch bias voltage control cannot be changed.

The control function of the synchronization detector 201 in the optical transmitter of each of the first to fourth preferred embodiments may be implemented by allowing a microcomputer or the like provided in the optical transmitter to process a computer program for performing a control method. Additionally, the optical transmitter according to each of the first to fourth preferred embodiments may be applicable to an optical communication system in which an optical signal transmitted from the optical transmitter is transmitted through an optical fiber to be received by an optical receiver. Furthermore, the two or more optical transmitters described in each of the first to fourth preferred embodiments are provided and may be applicable to a wavelength division multiplex communication system (WDM: wavelength division multiplexing). The wavelength division multiplex communication system is a communication system in which optical signals transmitted from the two or more optical transmitters are wavelength division multiplexed, transmitted through an optical fiber, separated in wavelength at a receiving side, and received for each wavelength by two or more receivers.

<Effects>

In the optical transmitter according to this preferred embodiment, the controller 200 includes a low-frequency signal generator 203c that generates a low-frequency signal, and the controller 200 determines the bias voltage to be applied to the optical phase regulator such that the phase difference between the output light beams from the two optical modulators becomes $\pi/2$, in a state where a low-frequency signal is superimposed on the bias voltage to be applied to the optical phase regulator 103.

Accordingly, the low-frequency signal is superimposed on the bias voltage to be applied to the optical phase regulator 103, so that the bias voltage control of the optical phase regulator 103 can be performed at a higher speed.

In the optical transmitter according to this preferred embodiment, the controller 200 searches for adjacent two bias voltages (Vps1 and Vps2) at which the output light beams from the two optical modulators (first and second optical modulators 101 and 102) have the same phase and opposite phases, while changing the bias voltage to be applied to the optical phase regulator 103, on which the low-frequency signal is superimposed, and determines a value obtained by adding the two bias voltages and dividing a resulting value by two, as the bias voltage Vps at which the phase difference between the output light beams from the two optical modulators becomes $\pi/2$.

Accordingly, in the initial value search, the bias voltage to be applied to the optical phase regulator 103 (PS bias voltage) is first regulated such that the phase difference between the output light beams of the first and second optical modulators 101 and 102 becomes π/2. Consequently, the output light beams from the first and second optical modulators 101 and 102 become orthogonal with each other, so that the bias voltages of the first and second optical modulators 101 and 102 can be independently controlled.

In the optical transmitter according to this preferred embodiment, in a case where a difference between the adjacent two bias voltages (Vps1 and Vps2) exceeds a predetermined threshold value, the controller 200 changes and searches again for the bias voltages to be applied to the two optical modulators.

Accordingly, Vps1 and Vps2 cannot be correctly set in a state where light is not output from at least one of the first and second optical modulators 101 and 102. Therefore, whether or not Vps1 and Vps2 are correctly set can be determined by comparing a magnitude relation between the difference between Vps1 and Vps2, and the predetermined threshold value (e.g., 1.3Vπ). In a case where Vps1 and Vps2 are not correctly set, Vps1 and Vps2 are searched again in a state where light beams are output from the first and second optical modulators 101 and 102.

While the invention has been shown and described in detail, the foregoing description is in all aspects illustrative and not restrictive. It is therefore understood that numerous modifications and variations can be devised without departing from the scope of the invention.

What is claimed is:

1. An optical transmitter comprising: an optical modulation unit that modulates an incident light beam; a modulation signal drive unit that inputs a modulation signal to said optical modulation unit; and a controller that controls said optical modulation unit and said modulation signal drive unit, wherein said optical modulation unit includes:

a branch unit that branches a light beam incident from a light source into two light beams;

two mach-zehnder optical modulators that modulate said respective two light beams based on applied bias voltages and input modulation signals;

an optical phase regulator that is connected to one of said two optical modulators, and regulates a phase of the light beam incident on the one optical modulator based on an applied bias voltage;

a multiplexer that multiplexes output light beams from said two optical modulators and outputs a multiplexed light; and a light intensity detector that detects intensity of the light beam output from said multiplexer, said modulation signal drive unit inputs said modulation signal to each of said two optical modulators, and said controller is a controller that searches for bias voltages to be applied to said two optical modulators in an initial state as a state where said modulation signals are not input, and determines the bias voltages, wherein the applied bias voltages are determined in a state where said modulation signal is not input to each of said two optical modulators, while keeping bias voltages applied to one optical modulator of said two optical modulators and said optical phase regulator constant, said controller determines the bias voltage applied to the other optical modulator as a first initial bias voltage such that an intensity of an output light beam from the other optical modulator of said two optical modulators becomes zero, based on the intensity of the light beam detected by said light intensity detector, and thereafter, the controller determines the bias voltage applied to the one optical modulator as a second initial bias voltage such that an intensity of an output light beam from said one optical modulator becomes zero, based on the intensity of the light beam detected by said light intensity detector, while applying said first initial bias voltage to the other optical modulator, and keeping the bias voltage applied to said optical phase regulator constant.

2. The optical transmitter according to claim 1, wherein said controller searches for a first bias voltage, at which the intensity of the light beam detected by said light intensity detector becomes maximum, and a second bias voltage, which is adjacent to the first bias voltage, and at which the intensity of the light beam detected by said light intensity detector is a local maximum, by changing the bias voltage to be applied to said other optical modulator, and determines a value obtained by adding the first and second bias voltages and dividing a resulting value by two, as said first initial bias voltage at which the intensity of the output light beam from said other optical modulator becomes zero.

3. The optical transmitter according to claim 2, wherein in a case where a difference between said first and second bias voltages exceeds a predetermined threshold value, said controller changes the bias voltage to be applied to said one optical modulator or said optical phase regulator and searches for said first and second bias voltages again.

4. The optical transmitter according to claim 3, wherein said threshold value is a value that is larger than a π shift voltage determined in said other optical modulator, and is smaller than 2 times of said π shift voltage.

5. The optical transmitter according to claim 2, wherein said controller includes a low-frequency signal generator that superimposes a low-frequency signal on each of said bias voltages to be applied to said two optical modulators.

6. The optical transmitter according to claim 1, wherein said controller determines the bias voltage to be applied to said optical phase regulator such that a phase difference between the output light beams from said two optical modulators becomes π/2, and determines said first and second initial bias voltages while applying the determined bias voltage to said optical phase regulator.

7. The optical transmitter according to claim 6, wherein said controller includes a low-frequency signal generator that generates a low-frequency signal, and said controller determines the bias voltage to be applied to said optical phase regulator such that the phase difference between the output light beams from said two optical modulators becomes π/2, in a state where a low-frequency signal is superimposed on the bias voltage to be applied to each of said two optical modulators.

8. The optical transmitter according to claim 6, wherein said controller includes a low-frequency signal generator that generates a low-frequency signal, and said controller determines the bias voltage to be applied to said optical phase regulator such that the phase difference between the output light beams from said two optical modulators becomes π/2, in a state where a low-frequency signal is superimposed on the bias voltage to be applied to said optical phase regulator.

9. The optical transmitter according to claim 8, wherein said controller searches for two adjacent bias voltages at which the output light beams from said two optical modulators have the same phase and opposite phases, respectively, while changing said bias voltage to be applied to said optical phase regulator, on which said low-frequency signal is superimposed, and determines a value obtained by adding the two adjacent bias voltages and dividing a resulting value by two, as a bias voltage at which the phase difference between the output light beams from said two optical modulators becomes $\pi/2$.

10. The optical transmitter according to claim 9, wherein in a case where a difference between said adjacent two bias voltages exceeds a predetermined threshold value, said controller changes the bias voltages to be applied to said two optical modulators and searches said adjacent two bias voltages again.

11. A control method of an optical transmitter, the optical transmitter including: an optical modulation unit that modulates an incident light beam; a modulation signal drive unit that inputs a modulation signal to said optical modulation unit; and a controller that controls said optical modulation unit and said modulation signal drive unit, wherein
said optical modulation unit includes:
  a branch unit that branches a light beam incident from a light source into two light beams;
  two mach-zehnder optical modulators that modulate said respective two light beams based on applied bias voltages and input modulation signals;
  an optical phase regulator that is connected to one of said two optical modulators, and regulates a phase of the light beam incident on the one optical modulator based on an applied bias voltage;
  a multiplexer that multiplexes output light beams from said two optical modulators and outputs a multiplexed light; and
  a light intensity detector that detects intensity of the light beam output from said multiplexer, and
said modulation signal drive unit inputs said modulation signal to each of said two optical modulators,
the control method of an optical transmitter comprising:
(a) turning off, by said controller, said modulation signal to be input to said two optical modulators;
(b) keeping, by said controller, bias voltages applied to said one optical modulator and said optical phase regulator constant, after said turning off;
(c) determining, by said controller, a bias voltage applied to the other optical modulator as a first initial bias voltage such that an intensity of an output light beam from the other optical modulator of said two optical modulators becomes zero, based on the intensity of the light beam detected by said light intensity detector, after said keeping; and
(d) determining, by said controller, a bias voltage applied to the one optical modulator as a second initial bias voltage such that an intensity of an output light beam from said one optical modulator becomes zero, based on the intensity of the light beam detected by said light intensity detector, while applying said first initial bias voltage to the other optical modulator, and keeping the bias voltage applied to said optical phase regulator constant, after said determining said bias voltage applied to the other optical modulator.

* * * * *